United States Patent
Chaudhari

(10) Patent No.: US 10,351,061 B1
(45) Date of Patent: Jul. 16, 2019

(54) IMPLEMENT ATTACHMENT GUIDANCE SYSTEM

(71) Applicant: DEERE & COMPANY, Moline, IL (US)

(72) Inventor: Rushikesh Chaudhari, Maharashtra (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/916,682

(22) Filed: Mar. 9, 2018

(51) Int. Cl.
 B60D 1/36 (2006.01)
 B60R 1/00 (2006.01)

(52) U.S. Cl.
 CPC ............... B60R 1/003 (2013.01); B60D 1/36 (2013.01); B60R 2300/808 (2013.01)

(58) Field of Classification Search
 CPC .................................. B60R 1/003; B60D 1/36
 See application file for complete search history.

(56) References Cited

U.S. PATENT DOCUMENTS

| | | | | |
|---|---|---|---|---|
| 7,195,267 B1* | 3/2007 | Thompson | ............... | B60D 1/36 280/477 |
| 8,138,899 B2* | 3/2012 | Ghneim | ................. | B60K 35/00 340/435 |
| 9,834,140 B2* | 12/2017 | Windeler | ................... | B60R 1/00 |
| 10,196,088 B2* | 2/2019 | Lavoie | ................... | B62D 13/06 |
| 10,214,062 B2* | 2/2019 | Huger | ....................... | G06T 7/11 |
| 10,214,241 B2* | 2/2019 | Shepard | ............... | B62D 15/029 |
| 2002/0145662 A1* | 10/2002 | Mizusawa | ................ | B60D 1/36 348/118 |
| 2002/0145663 A1* | 10/2002 | Mizusawa | ................ | B60D 1/36 348/118 |
| 2002/0149673 A1* | 10/2002 | Hirama | ...................... | B60R 1/00 348/118 |
| 2007/0216136 A1* | 9/2007 | Dietz | ....................... | B60D 1/36 280/477 |
| 2009/0236825 A1* | 9/2009 | Okuda | ..................... | B60D 1/36 280/477 |
| 2010/0039515 A1* | 2/2010 | Dietz | ....................... | B60D 1/36 348/148 |
| 2012/0073894 A1* | 3/2012 | Sprinkle | .............. | A01B 63/118 180/336 |
| 2012/0316735 A1* | 12/2012 | Von Mezynski | ......... | B60Q 1/24 701/48 |

(Continued)

Primary Examiner — Fernando Alcon
(74) Attorney, Agent, or Firm — Taft Stettinius & Hollister LLP; Stephen F. Rost

(57) ABSTRACT

A method and apparatus for guiding a work vehicle hitch to an implement. The apparatus includes an implement attachment guidance system including a camera located on the work vehicle to generate images of the connectors of the implement. A processor receives the generated images and identifies a position of the hitch couplers and identifies the implement connectors as objects. A connecting line between implement connector objects is identified as a virtual line. A reference line identifies the position of the hitch couplers. The processor determines an image distance between the reference line and the virtual line to determine a proximity of the work vehicle hitch to the implement. Distances between ends of the reference line and the virtual line are determined by the processor to provide a direction of travel indicator used by an operator to steer the work vehicle to engage the implement.

20 Claims, 4 Drawing Sheets

(56) References Cited

U.S. PATENT DOCUMENTS

| | | | |
|---|---|---|---|
| 2013/0321634 A1* | 12/2013 | Okano | B60R 1/00 348/148 |
| 2015/0077557 A1* | 3/2015 | Han | B60R 11/04 348/148 |
| 2016/0288601 A1* | 10/2016 | Gehrke | B60D 1/36 |
| 2016/0304122 A1* | 10/2016 | Herzog | B60D 1/36 |
| 2017/0177973 A1* | 6/2017 | Hu | G06K 9/6202 |
| 2017/0305462 A1* | 10/2017 | Janardhana | B62D 13/06 |
| 2018/0253106 A1* | 9/2018 | Inui | B60R 1/00 |
| 2018/0299885 A1* | 10/2018 | Herzog | B62D 13/06 |
| 2018/0312022 A1* | 11/2018 | Mattern | B62D 15/0285 |
| 2018/0365509 A1* | 12/2018 | Naserian | G06K 9/3208 |

* cited by examiner

IMPLEMENT ATTACHMENT GUIDANCE SYSTEM

FIELD OF THE DISCLOSURE

The present disclosure generally relates to a hitch for a work vehicle, and more particularly to a guidance system for attaching a hitch to an implement.

BACKGROUND

Work vehicles are configured to perform a wide variety of tasks for use such as construction vehicles, forestry vehicles, lawn maintenance vehicles, as well as on-road vehicles such as those used to plow snow, spread salt, or vehicles with towing capability. Additionally, work vehicles include agricultural vehicles, such as a tractor or a self-propelled combine-harvester, which include a prime mover that generates power to perform work. In the case of a tractor, for instance, the prime mover is often a diesel engine that generates power from a supply of diesel fuel. The diesel engine drives a transmission which moves wheels or treads to propel the tractor across a field. Tractors often include a power takeoff (PTO) which includes a shaft coupled to the transmission and driven by the engine to provide mechanical power to a work implement being pulled or pushed through a field by the tractor.

Hitch couplers, such as quick coupler hitches, have been developed to allow faster attachment of a tractor to a rear mounted implement. Quick coupler hitches may include an inverted U-shaped frame attached to a conventional three point hitch. The frame of a quick coupler hitch may have an upper hook and two lower coupling hooks or jaws with a latching and unlatching arrangement to hold the implement hitch pins. To hook up a quick coupler hitch to an implement, the hitch may be lowered and the tractor backed into place near the implement. The quick coupler hitch is then raised with the tractor's hydraulic system so that the upper hook engages the upper pin on the implement. Further lifting causes the implement's lower hitch pins to enter the lower hooks of the quick coupler.

The PTO that extends from the tractor to the implement is directly coupled to the implement to drive an operation being performed by the implement. In different embodiments, the implements include a spreader, a rotary mower, a rotary tiller, and other types of implements. The implement receives rotary power from the PTO to drive the operation of the particular implement to which the tractor is connected.

Different types of implements perform many different types of functions necessary to complete one or more given tasks. The demands of the tasks, however, can require the operator to switch implements quite often, even during the course of a single day. Connecting the implement to the work vehicle is a skilled job and requires a certain amount of skill that is learned over time. An unskilled or less skilled operator will take longer to attach the implement to the vehicle than it takes for a skilled operator to complete the same attachment. Connecting an implement to a three point hitch is a particularly skilled operation. In some cases, the operator requires the assistance of another person to complete the task of attaching the implement to the vehicle.

What is needed therefore is an assistance solution including a method and apparatus to attach the implement to a hitch, without the need for another person, other than a work vehicle operator, to connect the implement to the work vehicle.

SUMMARY

In one embodiment, there is provided an implement attachment guidance system for coupling a work vehicle to an implement, wherein the work vehicle includes a hitch having hitch couplers configured to engage implement connectors of the implement. The guidance system includes a reference guide including an edge and a camera configured to be mounted on the work vehicle. The camera includes a lens and an image sensor positioned with respect to the hitch couplers, wherein the lens is configured to transmit an image of the implement connectors and the edge to the image sensor. A controller is operatively connected to the camera, wherein the controller receives the image, processes the image to identify the connectors, processes the image to identify the edge, and determines a correspondence between the connectors and the edge. A display is operatively connected to the controller, wherein the display is configured to display a display image including an alignment indicator on the display. The alignment indicator indicates alignment of the work vehicle with the implement for connecting the hitch couplers to the implement connectors.

In another embodiment, there is provided a tractor including a cab and a hitch having a plurality of hitch couplers configured to be attached to a plurality of implement connectors of an implement. The tractor includes a reference guide having an edge and a camera mounted at the tractor. The camera includes a lens, and an image sensor, wherein the lens is positioned with respect to the hitch to receive and to transmit an image of the implement connectors and of the edge. A controller is operatively connected to the camera, wherein the controller receives the transmitted image, processes the transmitted image to identify the implement connectors and the edge, and determines an alignment indicator based on a correspondence between the edge and the implement connectors. A user interface includes a display located in the cab and is operatively connected to the controller, wherein the display is configured to display the alignment indicator configured to provide an alignment of the tractor with the implement.

In a further embodiment, there is provided a method of aligning a work vehicle hitch having a plurality of hitch couplers with an implement having a plurality of implement connectors using a camera configured to provide images of the plurality of hitch couplers and the plurality of implement connectors, wherein the images are transmitted to a processor configured to process the images for assisting an operator with an alignment of the hitch to the implement. The method includes: identifying a position of the hitch couplers from a reference line shown in at least one of the images; identifying from the at least one of the images two of the implement connectors as a first implement connector and a second implement connector; identifying a virtual line from the identified first implement connector and second implement connector; identifying an image distance in the image between the reference line and the connector edge; and providing a direction of travel indicator of the hitch with respect to the implement based on the identified image distance.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
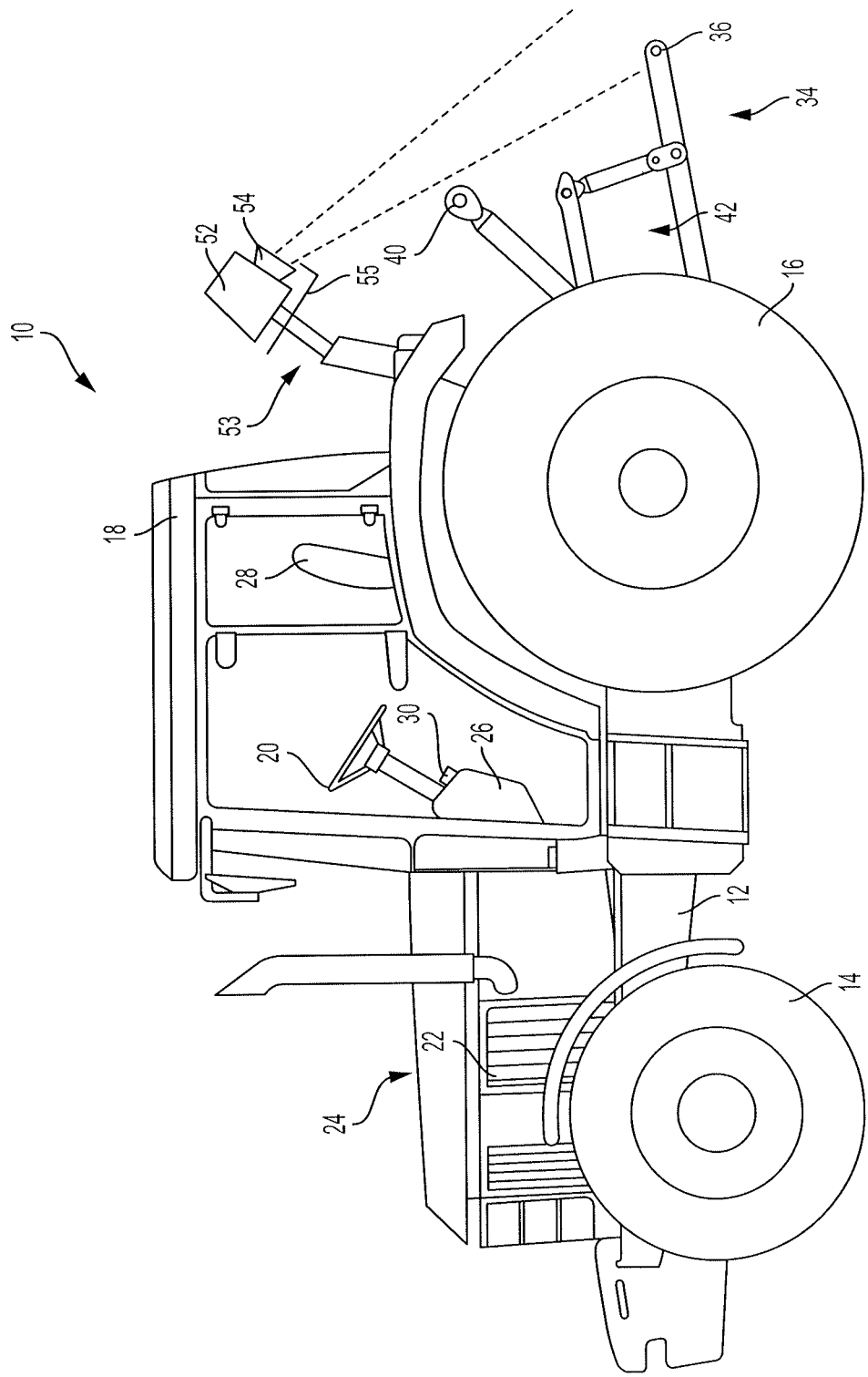
FIG. 1 is an elevational side view of a work vehicle, and more specifically, of an agricultural vehicle such as a tractor, including a hitch.

For the purposes of promoting an understanding of the principles of the novel disclosure, reference will now be made to the embodiments described herein and illustrated in the drawings and specific language will be used to describe the same. It will nevertheless be understood that no limitation of the scope of the novel disclosure is thereby intended, such alterations and further modifications in the illustrated devices and methods, and such further applications of the principles of the novel disclosure as illustrated therein being contemplated as would normally occur to one skilled in the art to which the novel disclosure relates.

FIG. 1 is an elevational side view of an agricultural vehicle, and more particularly a tractor 10, including a frame 12 supported on a pair of front wheels 14 and a set of rear wheels 16. While wheels are described in the embodiments, other ground engaging traction devices including tracks are contemplated. An operator cab 18 is mounted on the frame 12 and contains various controls for the vehicle 10 so as to be within the reach of a seated or standing operator. In one aspect, these controls may include a steering device, such as a steering wheel 20. A prime mover 22, such as an engine, is mounted on the frame 12 beneath a housing 24 and supplies power for driven components of the tractor 10. The engine 22, for example, is configured to drive a transmission (not shown), which is coupled to drive the wheels at various selected speeds and either in forward or reverse directions. In different embodiments, the front wheels, the rear wheels, or all of the wheels are driven in an all-wheel drive mode to move the tractor 10.

While the described embodiments are discussed with reference to a tractor, in addition to agricultural vehicles, other work vehicles are contemplated including construction vehicles, forestry vehicles, lawn maintenance vehicles, as well as on-road vehicles such as those used to plow snow, spread salt, or vehicles with towing capability.

The cab 18 defines an operator workstation 26, which is supported by the frame 12. The cab 18 also encloses a seat 28 for seating the operator. The operator workstation 26, in different embodiments, includes one or more of an operator user interface 30 including, but not limited to, a joystick, an accelerator pedal, and a power take-off (PTO) control device for turning on or off the PTO. Pedals for a brake and a clutch are also located in the cabin 18, but are not shown. The user interface 30, as partially illustrated in FIG. 3, includes a plurality of user controls 32 configured to enable the operator to control the operations and functions of the tractor 10. The user interface 30, in one embodiment, includes a display 33 having a plurality of user selectable buttons to select from a plurality of commands or menus, each of which is selectable through a touch screen. In another embodiment, the user interface 30 includes a plurality of mechanical push buttons as well as a touch screen. In another embodiment, the user interface 30 includes a display screen and only mechanical push buttons. In one or more embodiments, the user interface 30 includes an audio device 35, such as a speaker.

Figure 2:
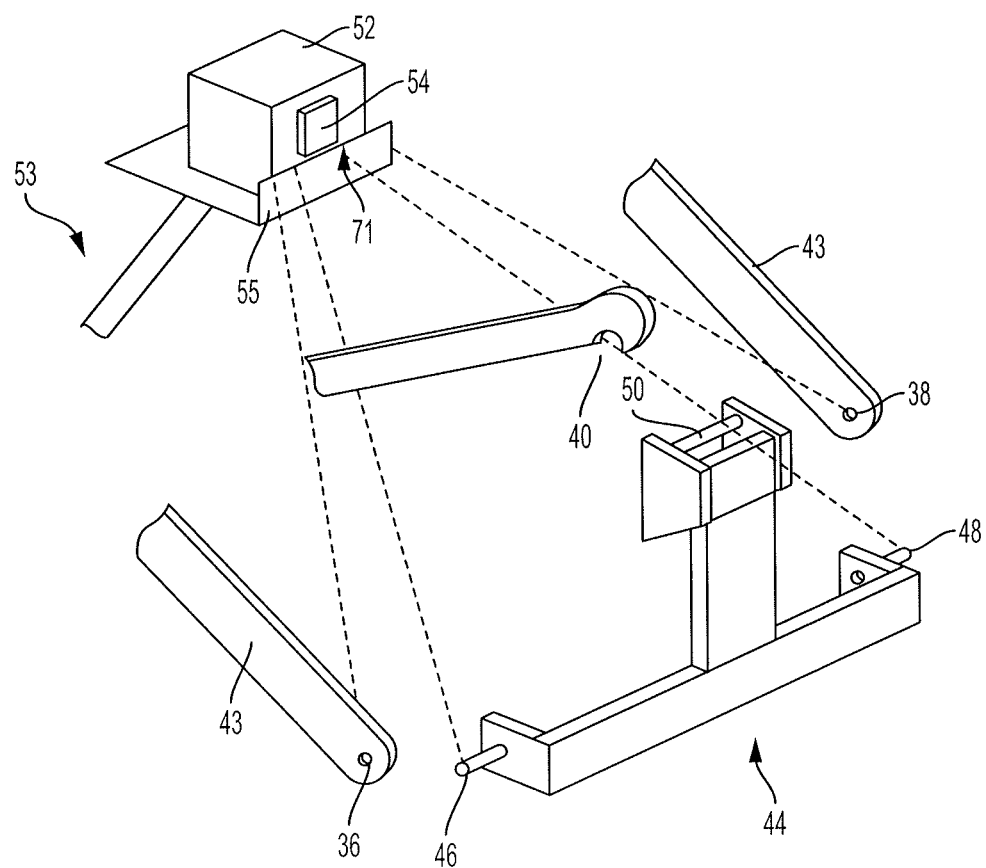
FIG. 2 is a rear perspective view of a hitch of a work vehicle disposed adjacently to an implement connector of an implement.

A hitch 34 is partially shown in FIG. 1 and further described in FIG. 2. As used herein the term "hitch" describes any type of hitch or implement coupler configured to attach a work vehicle to an implement having connectors that connect to the hitch. The hitch 34 is coupled to the frame 12 and extends from the rear of the vehicle 10. In one embodiment, the hitch 34 is configured as a three-point hitch including a first lower coupler 36, a second lower coupler 38, and an upper coupler 40. Each of the couplers 36, 38, and 40 are displaced appropriately from one another to provide a three point hitch configuration to engage similarly placed connectors on an implement, as is understood by one skilled in the art. Each of the couplers is fixedly coupled to a support frame 42 which is movable with respect to the tractor 10. The support frame 42 is coupled to arms 43, two of which are shown, that move responsively to commands provided by the operator at the user interface 30, or which are provided by the implement guidance control system.

The hitch 34 is adapted to couple the vehicle 10 to an implement connector 44 (See FIG. 2), which is fixedly attached to an implement (not shown). The implement connector 44 includes a first connector 46, a second connector 48, and a third connector 50, which are arranged at predefined locations to engage respectively, the couplers 36, 38, and 40. In one embodiment, each of the couplers 36, 38, and 40 are hooks or apertures which engage the respective first connector 46, second connector 48, and third connector 50. A camera 52 is fixed to a frame of the vehicle at a predetermined location with a camera support 53. A lens 54 of the camera 52 includes a field of view sufficient to provide an image that includes a portion of the hitch 34 and a portion of the implement connector 44. A reference guide 55 is disposed in front of a portion of the lens 54 and is used a point of reference for connecting the hitch 34 to the implement connector 44. In one embodiment, the field of view provides an observable area to the camera sufficient to show the first coupler 36, the second coupler 38, the first connector 46, the second connector 48, and the reference guide 55 in the same image received by an image sensor 56 (see FIG. 3) of the camera 52. The image sensor 56 receives focused light rays from the lens 54 and provides an image 58 having a plurality of pixels arranged in rectangular matrix of rows and columns, as would be understood by one skilled in the art. In other embodiments, two or more cameras are contemplated.

In another embodiment, the camera 52 is provided by a personal digital assistant, such as a cell phone, a smart phone, or a hand-held computer. In this embodiment, the support 53 is configured to fixedly connect the personal digital assistant to the vehicle 10 to capture the image of the hitch 34, the implement connector 44, and the reference guide 55, with the lens 54. The personal digital assistant includes a mobile application and is configured to communicate with a controller of the vehicle 10. In one embodiment, the personal digital assistant communicates with the vehicle controller using WI-FI, Bluetooth, RF, or other wireless communication technologies, as is known by one skilled in the art. The vehicle controller includes a wireless receiver and wireless transmitter. In another embodiment, the personal digital assistant is operatively connected to the vehicle controller with a hardwired connection.

Figure 3:
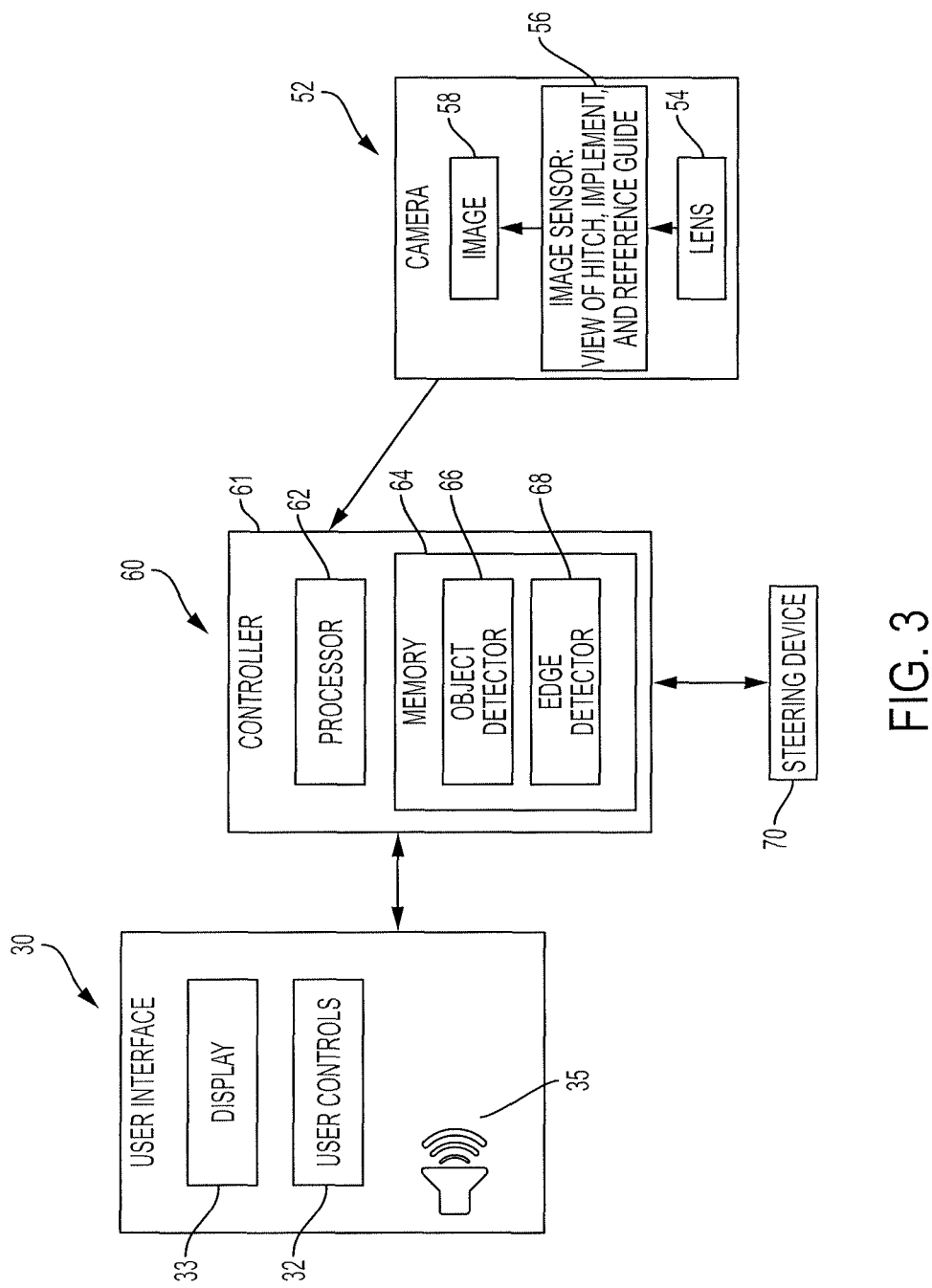
FIG. 3 is a block diagram of an implement attachment guidance system.

FIG. 3 illustrates a block diagram of an implement attachment guidance system 60, which includes the user interface 30. The guidance system 60 further includes a controller 61 operatively connected to the camera 52 and operatively connected to the user interface 30. The controller 61 includes a processor 62 and associated memory 64, configured to receive and process the camera image 58. In different embodiments, the memory 64 is configured as part of the processor 62 or is separate from the processor 62.

In different embodiments, the controller 61 is a distributed controller having separate individual controllers distributed at different locations on the vehicle. In addition, while the controller is generally hardwired by electrical wiring or cabling to related components, in other embodiments the controller includes a wireless transmitter and/or receiver to communicate with a sensing component or device that either provides information to the controller or transmits controller information to controlled devices.

The controller 61, in different embodiments, includes a computer, computer system, or other programmable devices. In other embodiments, the controller 61 includes one or more processors 62 (e.g. microprocessors), and the associated memory 64, which can be internal to the processor or external to the processor. The memory 64, in different embodiments, includes random access memory (RAM) devices comprising the memory storage of the controller 61, as well as any other types of memory, e.g., cache memories, non-volatile or backup memories, programmable memories, or flash memories, and read-only memories. In addition, the memory 64 can include a memory storage physically located elsewhere from the processing devices and can include any cache memory in a processing device, as well as any storage capacity used as a virtual memory, e.g., as stored on a mass storage device or another computer coupled to controller 61. The mass storage device can include a cache or other dataspace which can include databases. Memory storage, in other embodiments, is located in the "cloud", where the memory is located at a distant location which provides the stored information wirelessly to the controller 61.

The controller 61 executes or otherwise relies upon computer software applications, components, programs, objects, modules, or data structures, etc. Software routines resident in the memory accessed by the controller 61 are executed in response to the signals received. The computer software applications, in other embodiments, are located in the cloud. The executed software includes one or more specific applications, components, programs, objects, modules or sequences of instructions typically referred to as "program code". The program code includes one or more instructions located in memory and other storage devices which execute the instructions resident in memory, which are responsive to other instructions generated by the system, or which are provided at the user interface 30 operated by the user. The processor 62 is configured to execute the stored program instructions as well as to access data stored in one or more data tables in memory.

As illustrated in FIG. 3, the memory 64 includes an object detector 66 and an edge detector 68. The object detector 66 and edge detector are each software applications or program code which are used by the processor 62 to determine the content of the image 58. The object detector 66 is configured to determine the location of objects found in the image 58 and the edge detector 68 is configured to determine the relationship between the objects found in the image 58. Object detection software and edge detector software that determine the features appearing in the image 58 are known by those skilled in the art.

In one embodiment, the camera 52 is mounted to the vehicle 10 to capture in an image of both lower couplers 36 and 38, implement connections 46 and 48 of the implement, and an edge of the reference guide 55. In another embodiment, the lower couplers 36 and 38 are not shown. The image 58, in different embodiments, is a series of frame images or is a moving image generated by the camera showing movement of the vehicle 10 with respect to the implement. More particularly, movement of the hitch 34 with respect to the implement connector 44 is imaged by the image sensor 56 as the vehicle 10 is moved toward the implement to connect the couplers 36, 38, and 40 to the connectors 46, 48, and 50.

The output of the camera 52 is interfaced with controller 61 which processes the image 56 with the processor 62, and which then transmits the processed images to the display 33 of the user interface 30. In one embodiment, the controller 61 and display 33 are a single integrated component.

The camera 52 is mounted on a rear side of the vehicle 10 such that the image 58 presents a view of first and second lower couplers 36 and 38, the first and second implement connectors 46 and 46, and the reference guide 55 in the same image, defined as an interface image. As the vehicle is moved toward the implement, the couplers of the hitch 34 move toward the connectors of the implement connector 44. Consequently, during implement connection, images of the interface between the hitch 34 and the implement are recorded by the camera 52, as the vehicle approaches the implement for connection. In one embodiment, the interface image is a continuous video image transmitting a sequence of images recorded sufficiently close together to provide a frame rate sufficient to be perceived as having motion. In another embodiment, the interface image is a plurality of images being transmitted at a rate insufficient to be perceived as having motion. In case, the transmission of images is sufficient to indicate a change in position between the hitch 34 with respect to the implement connector 44 as the vehicle 10 is moved toward the implement.

The processor 62, using the object detector 66, identifies objects located in the images as connectors of the implement connector 44. In one embodiment, the processor 62 identifies connectors 46 and 48 of the implement connector 44. Once identified as objects, the processor 62, using the edge detector 68, identifies and generates a "virtual" line 82 (see FIG. 4) that extends between the connector 46 and the connector 48 to indicate the alignment of the two with respect to one another. In addition, the processor identifies and generates an edge 71 (see FIG. 2) of the reference guide 55. In other embodiments, different objects are identified and different edges between couplers or connectors are also identified.

The identified edge 71 is considered to be a "reference line" 84 which is used to adjust a position of the vehicle 10 with the implement coupler 44. The edge 71 is fixed at a position that is parallel to a line connecting the first and second lower couplers 36 and 38, such that the position of the couplers 36 and 38 with respect to the vehicle 10 are known.

Figure 4:
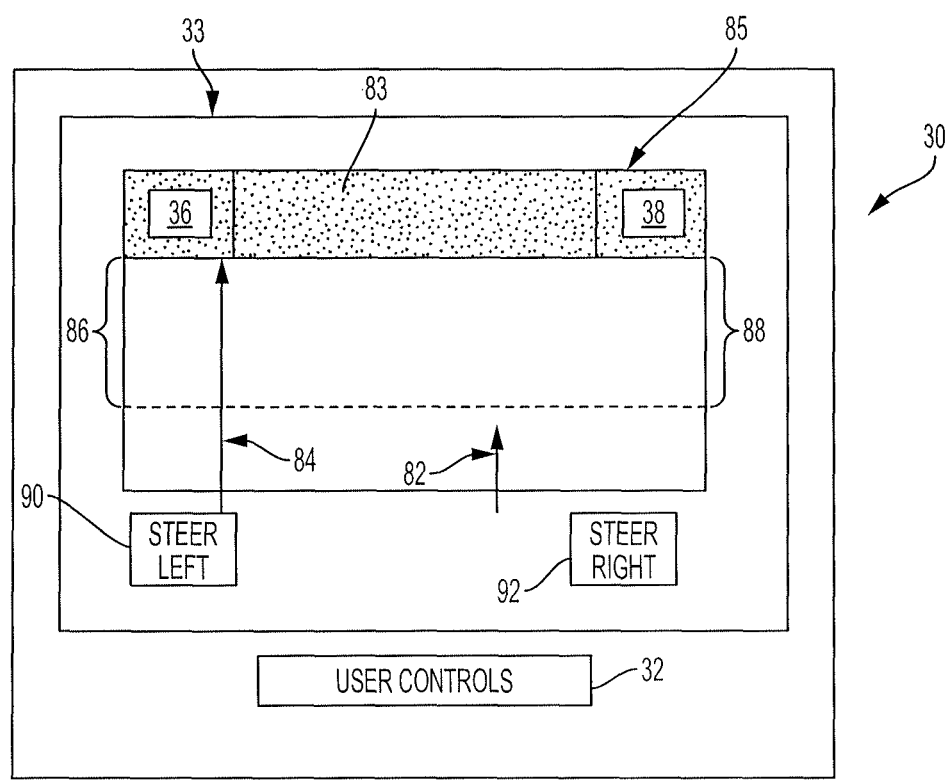
FIG. 4 is a display of the implement attachment guidance system.

After the virtual line 82 and the reference line 84 are identified, the processor 62 generates an image 85 displayed at the display 33 of the user interface 30 as illustrated in FIG. 4. A first virtual line 82 is displayed to represent the virtual line connecting connectors 46 and 48 of FIG. 2. A second line, the reference line 84, is displayed to represent a reference line defined by the edge 71. The virtual line 82 is spaced from a reference line 84, wherein the space between lines 82 and 84 is displayed to represent a reference distance or proximity between the hitch couplers and the implement connectors.

In different embodiments, an image of the edge 71 including a portion of the reference guide 55 is displayed and is shown by the grey bar 83 in the image 85. In different embodiments, images of the couplers 36 and 38 are displayed as either actual images of the couplers or as representational images of the coupler generated by the image detector. In other images, only the reference line 84 is displayed. The line 82 is spaced from the line 84 by a first distance 86, displayed to the left of the display 33 and a second distance 88 is displayed to the right of the display 33. The distance 86 represents a first distance between the coupler 38 and the connector 48 on the left side of the tractor 10, where the left side is on the operator's left side as the operator faces forward while driving the tractor in a forward direction. The distance 88 represents a second distance between the coupler 36 and the connector 46 on the right side of the tractor. When the distance between coupler 38 and the connector 48 is substantially the same as the distance between the coupler 36 and the connector 46, then the distance 86 is substantially the same as the distance 88.

Each of the distances 86 and 88 is determined by the controller 61 as a pixel distance by determining the number of pixels between each of the ends of the line 82 and the line 84 represented as the distance 86 and the distance 88. When the vehicle 10 is properly aligned with the implement the number of pixels at distances 86 and 88 is the same. As the vehicle 10 approaches the implement, the image distance between the line 82 and the line 84 is reduced.

If the vehicle 10 is misaligned with the implement, the distance 86 will be different than the distance 88. The difference in distance between distance 86 and distance 88 is determined by the processor based on a pixel count and is used to generate a steer left command 90 and a steer right command 92. If the distance 86 is less than the distance 88, processor generate steer left command and if distance 86 is more than 88, processor generates steer right command. If the steer left command is highlighted, illuminated, or displayed, the operator adjusts the steering device 20 to move the vehicle to the left as the vehicle is backed up to approach the implement. If the steer right command is highlighted, illuminated, or displayed, the operator moves the steering device 20 to move the vehicle to the right as the vehicle is backed up to approach the implement. Once both the lines 82 and 84 are substantially parallel, the operator returns the steering device 20 to a neutral position so that the vehicle is backed up toward the implement in a straight line path.

When the vehicle 10 is sufficiently close to the implement such that the implement connection points are closer to the hitch coupler locations, the object detection algorithm and edge detection algorithm generates the reference line 82 of FIG. 4. The processor 62 determines whether the line 82 is substantially parallel with line 84 by counting pixels on both edges of the image frame. If the lines 82 and 84 are substantially parallel, in one embodiment, the display 30 does not display the line 82. In another embodiment, if the lines are substantially parallel, the line 82 is displayed. The distance between the lines 82 and 84 at either end of the lines illustrates a correspondence or physical relationship between the vehicle coupler and implement.

If, however, the hitch couplers are not aligned with the implement connectors, i.e. they are not substantially parallel in the image, the processor 62 generates a steering indicator based on an image including the reference line 82 with respect to the line 84. The two lines being non-parallel illustrate a direction to the operator for turning the steering device, which would move the line 82 to be parallel with the line 84.

As the operator moves the vehicle closer to implement, the controller 61 processes the images captured by the camera 52 and provides an indication to the operator for moving the vehicle in a correct direction to properly align the vehicle with the implement.

In one embodiment, the operator determines when the hitch couplers of the vehicle hitch engage the connectors of the implement. In another embodiment, when the vehicle is moving and the hitch coupler reference line 84 is substantially parallel with implement reference line 82, the controller 61 provides one or both of a visual indication and audio indication transmitted by the speaker 35 when both reference line 84 and reference implement line 82 are overlapping. The overlapping of lines 82 and 84 indicates that the lower two connection points of tractor coupler are correctly positioned to connect with the implement connection points.

The present disclosure provides an apparatus and method to assist an operator when moving a vehicle in a correct direction, as well as in a correct alignment, with an implement. This enables the operator to connect the vehicle to the implement in a first attempt, without wasting time during alignment. While the apparatus and method are operable at different vehicle speeds, movement of the vehicle at a relatively slow speed, such as in a "creeper mode", can reduce the number of attempts needed to connect the vehicle to the implement. With the described apparatus and method, even a relatively unskilled operator is able to connect the vehicle to the implement without support from another person, thus increasing productivity. The described embodiments reduce an operator's time to connect the vehicle to the implement, and consequently increase machine productivity.

While exemplary embodiments incorporating the principles of the present disclosure have been described hereinabove, the present disclosure is not limited to the described embodiments. Instead, this application is intended to cover any variations, uses, or adaptations of the disclosure using its general principles. In addition, while the terms greater than and less than have been used in making comparison, it is understood that either of the less than or greater than determines can include the determination of being equal to a value. Further, this application is intended to cover such departures from the present disclosure as come within known or customary practice in the art to which this disclosure pertains and which fall within the limits of the appended claims.

The invention claimed is:

1. An implement attachment guidance system for coupling a work vehicle to an implement, the work vehicle including a hitch having hitch couplers configured to engage implement connectors of the implement, the guidance system comprising:
 a reference guide including an edge;
 a camera configured to be mounted on the work vehicle, the camera including a lens and an image sensor positioned with respect to the hitch couplers, wherein the lens is configured to transmit an image of the implement connectors and the edge to the image sensor;
 a controller operatively connected to the camera, wherein the controller receives the image, processes the image to identify the connectors, processes the image to identify the edge, and determines a correspondence between the connectors and the edge; and a display operatively connected to the controller, wherein the display is configured to display a display image including an alignment indicator on the display, the alignment indicator indicating alignment of the work vehicle with the implement for connecting the hitch couplers to the implement connectors.

2. The implement guidance system of claim 1 wherein the alignment indicator includes a virtual line indicating a position of the implement connectors and a reference line indicating a position of the hitch couplers.

3. The implement guidance system of claim 2 wherein the alignment indicator includes a distance between the virtual line and the reference line, the distance between the virtual line and the reference line being an indication of an actual distance between the hitch couplers and the implement connectors.

4. The implement guidance system of claim 3 wherein the alignment indicator includes a steering direction indicator.

5. The implement guidance system of claim 4 wherein the steering direction indicator includes a steer left indicator and a steer right indicator.

6. The implement guidance system of claim 2, wherein the control circuitry includes a processor and a memory, wherein the memory includes software instructions including an object detector and an edge detector, wherein the object detector is configured to identify the implement connectors as objects, and the edge detector is configured to identify the virtual line from a line connecting one of the implement connectors to another of the implement connectors and to identify the reference line from a line defined by the edge of the reference guide.

7. The implement guidance system of claim 6 wherein the display image includes a two dimensional image frame, wherein the distance between the hitch couplers and the implement connectors is based on a number of pixels of the image frame separating the virtual line from the reference line.

8. The implement guidance system of claim 4, wherein the steering direction indicator includes a first steering direction and a second steering direction, the steering direction being displayed on the display, wherein each of the first and second steering directions indicate a different direction of travel for the work vehicle to be steered with respect to the implement.

9. The implement guidance system of claim 8, wherein the hitch couplers are couplers of a three point quick connect hitch.

10. A tractor including a cab and a hitch having a plurality of hitch couplers configured to be attached to a plurality of implement connectors of an implement, the tractor comprising:
a reference guide including an edge;
a camera mounted at the tractor, the camera including a lens, and an image sensor, wherein the lens is positioned with respect to the hitch to receive and to transmit an image of the implement connectors and of the edge;
a controller operatively connected to the camera, wherein the controller receives the transmitted image, processes the transmitted image to identify the implement connectors and the edge, and determines an alignment indicator based on a correspondence between the edge and the implement connectors; and
a user interface including a display located in the cab and operatively connected to the controller, wherein the display is configured to display the alignment indicator configured to provide an alignment of the tractor with the implement.

11. The tractor of claim 10 wherein the alignment indicator includes a virtual line indicating a position of the implement connectors and a reference line indicating a position of the hitch couplers.

12. The tractor of claim 11 wherein the alignment indicator includes a distance between the virtual line and the reference line, the distance between the virtual line and the reference line being an indication of an actual distance between the hitch couplers and the implement connectors.

13. The tractor of claim 3 wherein the alignment indicator includes a steering direction indicator.

14. The tractor of claim 13 wherein the steering direction indicator includes a steer left indicator and a steer right indicator.

15. The tractor of claim 11, wherein the control circuitry includes a processor and a memory, wherein the memory includes software instructions including an object detector and an edge detector, wherein the object detector is configured to identify the implement connectors as objects, and the edge detector is configured to identify the virtual line from a line connecting one of the implement connectors to another of the implement connectors and to identify the reference line from a line defined by the edge of the reference guide.

16. The tractor of claim 15 wherein the display image includes a two dimensional image frame, wherein the distance between the hitch couplers and the implement connectors is based on a number of pixels of the image frame separating the virtual line from the reference line.

17. The tractor of claim 13, wherein the steering direction indicator includes a first steering direction and a second steering direction, the steering direction being displayed on the display, wherein each of the first and second steering directions indicate a different direction of travel for the work vehicle to be steered with respect to the implement.

18. A method of aligning a work vehicle hitch having a plurality of hitch couplers with an implement having a plurality of implement connectors using a camera configured to provide images of the plurality of implement connectors, wherein the images are transmitted to a processor configured to process the images for assisting an operator with an alignment of the hitch to the implement, the method comprising:
identifying a position of the hitch couplers from a reference line shown in at least one of the images;
identifying from the at least one of the images two of the implement connectors as a first implement connector and a second implement connector;
identifying a virtual line from the identified first implement connector and second implement connector;
identifying an image distance in the image between the reference line and the connector edge; and
providing a direction of travel indicator of the hitch with respect to the implement based on the identified image distance.

19. The method of claim 18, wherein the identifying an image distance step includes identifying an image distance based on a number of image pixels located between the reference line and the virtual line.

20. The method of claim 19, wherein the providing a direction of travel indicator step includes providing a direction of travel indicator having a first steering direction and a second steering direction, wherein each of the first steering direction and second steering direction is based on the number of image pixels.

* * * * *